(No Model.)
M. W. CHAMBERLAIN.
SAWMILL DOG.
No. 510,891. Patented Dec. 19, 1893.
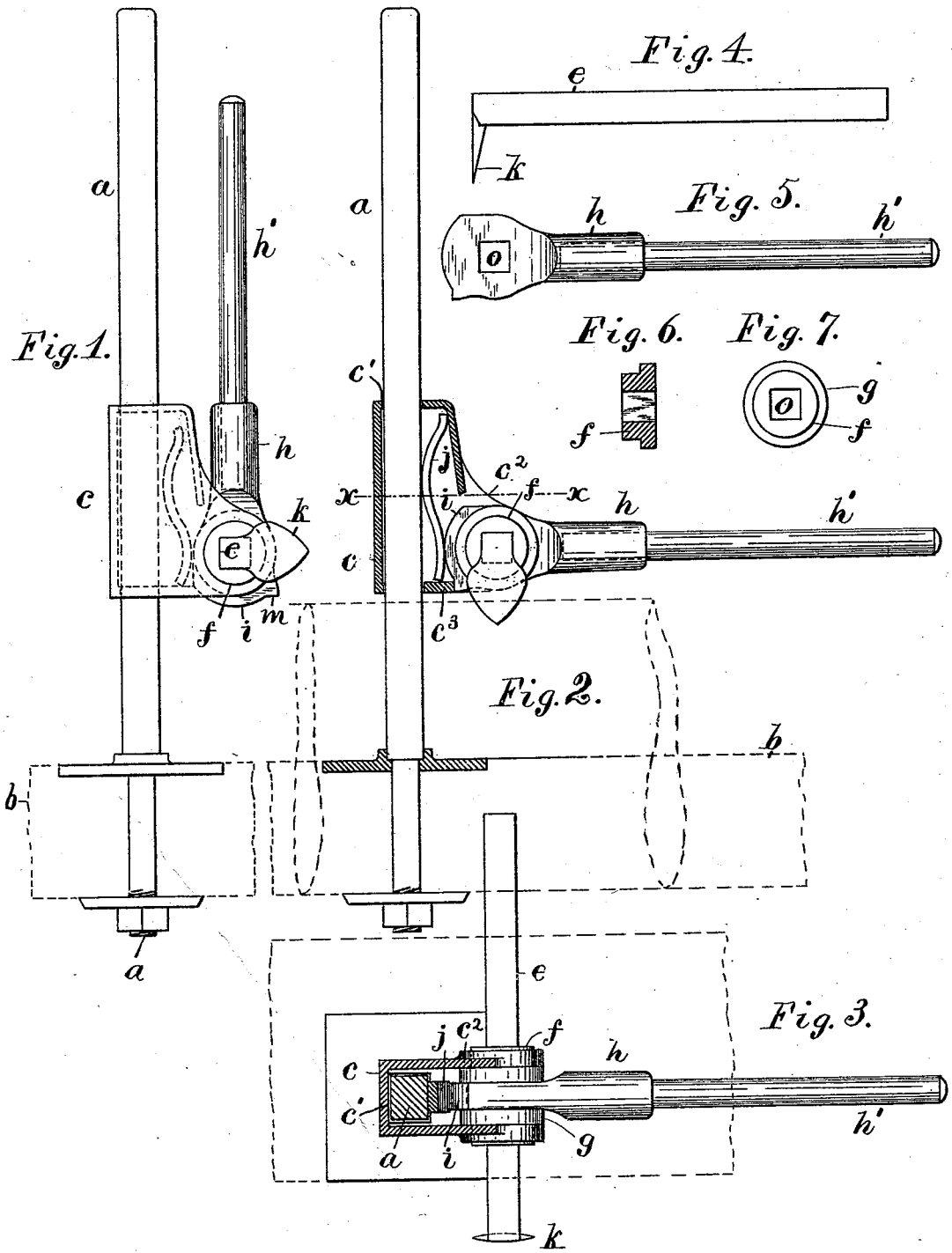
Attest:
L. Lee
Edw. F. Kinsey
Inventor.
M. W. Chamberlain,
per Crane & Miller, attys.
THE NATIONAL LITHOGRAPHING COMPANY,
WASHINGTON, D. C.

UNITED STATES PATENT OFFICE.

MARCUS W. CHAMBERLAIN, OF BARTLEY, NEW JERSEY, ASSIGNOR OF ONE-HALF TO SAMUEL BARTLEY, OF SAME PLACE.

SAWMILL-DOG.

SPECIFICATION forming part of Letters Patent No. 510,891, dated December 19, 1893.

Application filed November 22, 1892. Serial No. 452,867. (No model.)

*To all whom it may concern:*

Be it known that I, MARCUS W. CHAMBERLAIN, a citizen of the United States, residing at Bartley, Morris county, New Jersey, have invented certain new and useful Improvements in Sawmill-Dogs, fully described and represented in the following specification and the accompanying drawings, forming a part of the same.

This invention relates to an improved means for holding and securing the log on the carriage during the operation of sawing into boards, planks, &c.; and it consists primarily in the combination with a post or standard, of a vertically adjustable head, and a horizontally adjustable dog bar arranged to rotate in the head and having a dog projected laterally from its forward end. By such a construction of the dog it may be forced into the wood by a sliding or cutting movement instead of by direct pressure as in common constructions.

The invention also consists in an improved sliding head with a spring and lever for locking it in position upon the post or standard, and in a dog bar inserted through the eye of the lever so that the head may be locked at the same time that the dog is forced into the wood.

In the annexed drawings, Figure 1 is an elevation of the improvement with the sliding head unlocked and the dog retracted. Fig. 2 is an elevation of the same with one cheek of the sliding head removed to expose the interior construction, the dog being turned into the log. Fig. 3 is a sectional plan taken on line $x$, $x$, in Fig. 2. Fig. 4 is a side view of the dog bar and dog. Fig. 5 is a side view of the lever. Fig. 6 is a section, and Fig. 7 a side view of one of the collars which forms the journal for the dog bar.

The post or standard $a$ is shown of rectangular section and secured in the set beam $b$. The head is formed in one piece of steel with square holes $c'$ at the top and bottom to slide vertically upon the post $a$, and is formed with cheeks $c^2$ having perforated bosses $d$ constituting bearings in which the dog bar $e$ is rotatably supported. The dog bar is formed of square section and is journaled in the bearings $d$ by means of collars $f$ which are inserted in the bearings from the inner sides of the cheeks, and are then held in place by the flanges $g$. A lever socket $h$ is fitted between the flanges $g$, and is formed like the collars with a square hole $o$ to fit the dog bar loosely. A handle $h'$ connected with the lever socket forms a lever for turning the dog bar. A concentric cam surface $i$ is formed upon the lever socket opposite the handle $h'$, and a leaf spring $j$ is inserted between the lever socket and the post $a$ with its end curved to bear upon the cam. The end of the dog bar is provided with a laterally projecting lip $k$, constituting the dog, which is beveled backwardly from the end of the bar. When the dog lever or handle $h'$ is turned upward the dog bar is fitted in the socket $h$ with the dog projecting laterally, as shown in Fig. 1, and is thus adapted to be adjusted over the log in readiness to dog the same. The rotation of the dog bar which is effected by turning the handle downwardly a quarter turn, as shown in Fig. 2, then operates to turn the dog below the dog bar and to force it edgewise into the log. Such a movement enables it to penetrate the wood with a sliding or cutting action, and the dog thus operates with much less resistance than where it is forced downwardly into the wood as in other constructions, and the backward bevel upon the inner face of the dog also serves to draw the log more closely against the standard. With the lever socket $h$ and its handle turned upward as in Fig. 1, the cam $i$ is turned downward out of contact with the spring $j$, and the tension of the spring is therefore relaxed and the head $c$ may then be adjusted into any desired position vertically upon the post $a$. The dog bar may also be adjusted longitudinally in the socket $o$ formed within the lever and the bearing collars $f$, and the downward movement of the handle which turns the dog into the log then forces the cam against the spring $j$ and locks the head upon the post $a$; while the friction of the dog bar in the collars $f$ holds it rigidly in position. To release the dog, the hand lever is turned upward, simultaneously releasing the spring clamp upon the post, and the head and dog may then be adjusted into any desired position for further use.

When not in use, the head c may be raised into any convenient position upon the post a, and locked thereon by turning the lever handle downward in the position shown in Fig. 2. As only one movement is required to secure the sliding head and the dog in their operative position, or to release the same, it is obvious that the dog may be readily adjusted and used.

The dog may be used upon any saw mill where the socket lever can be journaled so as to receive the dog bar.

The construction of the post and the nature of the head which slides upon the same to carry the socket lever are entirely immaterial to the operation of the dog, and I have therefore claimed the dog and its lever independently of such features.

Having thus set forth the invention, what I claim herein is—

1. In a saw-mill dog, the combination, with a post, of a head movable vertically upon the same, a spring applied to the side of the post, a lever journaled in the head and provided with a cam to tighten the spring, and an adjustable dog bar rotated by the lever, as set forth.

2. In a saw mill dog, the combination, with a rectangular post a, of the sliding head c formed with the circular bearings as described, the collars f provided with the flanges g, the lever h fitted between the flanges, and the dog bar e fitted movably to the lever and collars, as set forth.

In testimony whereof I have hereunto set my hand in the presence of two subscribing witnesses.

MARCUS W. CHAMBERLAIN.

Witnesses:
W. B. SALMON,
J. E. APGAR.